United States Patent [19]

Shaffer et al.

[11] Patent Number: 4,908,546
[45] Date of Patent: Mar. 13, 1990

[54] LEAD-IN WIRE FOR COMPACT FLUORESCENT LAMPS

[75] Inventors: John W. Shaffer, Montoursville, Pa.; Peter V. Caleshu, Lynnfield; David W. Johnston, Amesbury, both of Mass.

[73] Assignee: GTE Products Corporation, Danvers, Mass.

[21] Appl. No.: 211,797

[22] Filed: Jun. 27, 1988

[51] Int. Cl.$^4$ ................................. H01J 5/50
[52] U.S. Cl. ................... 313/331; 313/491; 313/623; 174/50.59; 174/50.61
[58] Field of Search ............... 313/331-333, 313/623, 491, 493; 174/50.5, 50.59, 50.61

[56] References Cited

U.S. PATENT DOCUMENTS

| | | | |
|---|---|---|---|
| 2,219,758 | 10/1940 | Baier et al. | 174/50.5 X |
| 2,473,888 | 6/1949 | Jordan et al. | 313/332 X |
| 2,555,877 | 6/1951 | Doran | 174/50.61 X |
| 3,109,054 | 10/1963 | Kuhnapfel et al. | 174/50.61 X |
| 3,991,337 | 11/1976 | Notelteirs | 313/332 X |
| 4,015,165 | 3/1977 | Hardies | 313/331 X |
| 4,204,137 | 5/1980 | Roy | 313/491 |
| 4,374,340 | 2/1983 | Bouwknegt et al. | 313/493 |
| 4,426,602 | 1/1984 | Mollet et al. | 313/493 |
| 4,481,442 | 11/1984 | Albrecht et al. | 313/493 |

Primary Examiner—Donald J. Yusko
Assistant Examiner—Michael Horabik
Attorney, Agent, or Firm—Carlo S. Bessone

[57] ABSTRACT

This invention relates to the lead-in wires used in association with press seals in soda-lime glass for achieving electrical connection into the sealed envelope of a compact fluorescent lamp. The lead-in wires have a core comprising nickel and iron. A metallic plating on the core prevents formation of $Fe_2O_3$ during lamp sealing. The invention improves lamp life by maintaining seal integrity at elevated seal temperatures.

18 Claims, 1 Drawing Sheet

LEAD-IN WIRE FOR COMPACT FLUORESCENT LAMPS

TECHNICAL FIELD

This invention relates to arc discharge lamps and more particularly to the lead-in wires sealed in compact fluorescent lamps.

BACKGROUND OF THE INVENTION

The high lumen per watt efficacy and long life inherent in fluorescent lamps has given rise to the development of a number of different types of small compact fluorescent lamps in the lighting industry. These small, efficient, and long life lamps are gradually making inroads into lighting applications that have traditionally been dominated by incandescent lamps. Wattage per unit surface area is higher than for conventional fluorescent lamps so that compact fluorescent lamps operate hotter.

Examples of compact fluorescent lamps are disclosed in U.S. Pat. No. 4,374,340, which issued to Bouwknegt et al on Feb. 15, 1983; U.S. Pat. No. 4,426,602, which issued to Mollet et al on Jan. 17, 1984; and U.S. Pat. No. 4,481,442, which issued to Albrecht et al on Nov. 6, 1984.

A number of lighting fixture manufacturers have designed reflector-type adaptors that utilize compact fluorescent lamps as alternatives to R or PAR type reflector lamps. Such lamps in spot or flood varieties are often used for localized display lighting in stores, or as ceiling-mounted recessed down lights in buildings. The use of inherently hotter compact fluorescent lamps in such enclosed or convection-restricted fixtures results in operating temperatures that were seldom, if ever, previously encountered by fluorescent lamps. By way of example only, glass seal press temperatures over 160 degrees Celsius have been measured on some compact fluorescent lamps in such fixtures.

It is conventional to form the lead-in wires of the lamps from a nickel-iron alloy comprising, for example, 50.5% by weight nickel and having an iron oxide layer on the surface of the wire to improve the hermetic seal. U.S. Pat. No. 4,204,137, which issued to Roy on May 20, 1980, teaches the formation of an oxide film on a nickel-iron portion of the lead-in wire passing through the pinch region of the flare. Normally, a very good seal match is obtained between soda-lime glass and pre-oxidized nickel-iron alloy lead-in wires.

However, it has been discovered that when higher wattage compact fluorescent lamps having pre-oxidized nickel-iron lead-in wires are operated in these hotter fixtures, seal leaks may develop. Although not completely understood, it is believed that the combined effect of the ultraviolet radiation produced in the lamp and increased seal temperatures on the oxide layer causes the stress conditions of the seal to change during lamp operation.

BRIEF SUMMARY OF THE INVENTION

It is, therefore, an object of the present invention to obviate the disadvantages of the prior art.

It is still another object of the invention to provide an improved lead-in wire for compact fluorescent lamps.

It is still another object of the invention to provide an improved compact fluorescent lamp suitable for operation in hotter fixtures.

These objects are accomplished in one aspect of the invention by the provision of a fluorescent lamp having a sealed envelope of light-transmitting vitreous material having a pair of end portions. A phosphor layer is disposed on the internal surface of the envelope and an ionizable medium is contained within the envelope. An electrode structure is located within each of the end portions and includes an electrode supported by a pair of lead-in wires. The lead-in wires have a core comprising nickel and iron. The core has a metallic plating thereon which prevents formation of $Fe_2O_3$ during sealing. Preferably, the plating is selected from the group consisting of nickel, chromium, platinum, and gold.

The above objects are accomplished in another aspect of the invention, by the provision of a fluorescent lamp having a sealed glass envelope having a pair of end portions. A phosphor layer is disposed on the internal surface of the envelope and an ionizable medium is contained within the envelope. An electrode structure is located within each of the end portions and includes an electrode supported by a pair of lead-in wires. The lead-in wires have a nickel-iron alloy core with a nickel plating thereon. The seal formed between the glass and the lead-in wires is sufficient to maintain seal hermeticity when the temperature of said seal reaches about 160 degrees Celsius during operation of the lamp.

In accordance with further teachings of the present invention, the lead-in wires have a nickel plating which equals from about one percent by weight to about ten percent by weight of the lead-in wires. In a preferred embodiment, the lead-in wires are formed from a nickel-iron alloy core with a nickel plating.

BRIEF DESCRIPTION OF THE DRAWINGS

The invention will become more readily apparent from the following exemplary description in connection with the accompanying drawings, wherein.

BEST MODE FOR CARRYING OUT THE INVENTION

For a better understanding of the present invention, together with other and further objects, advantages and capabilities thereof, reference is made to the following disclosure and appended claims in connection with the above-described drawings.

Figures 1, 2:
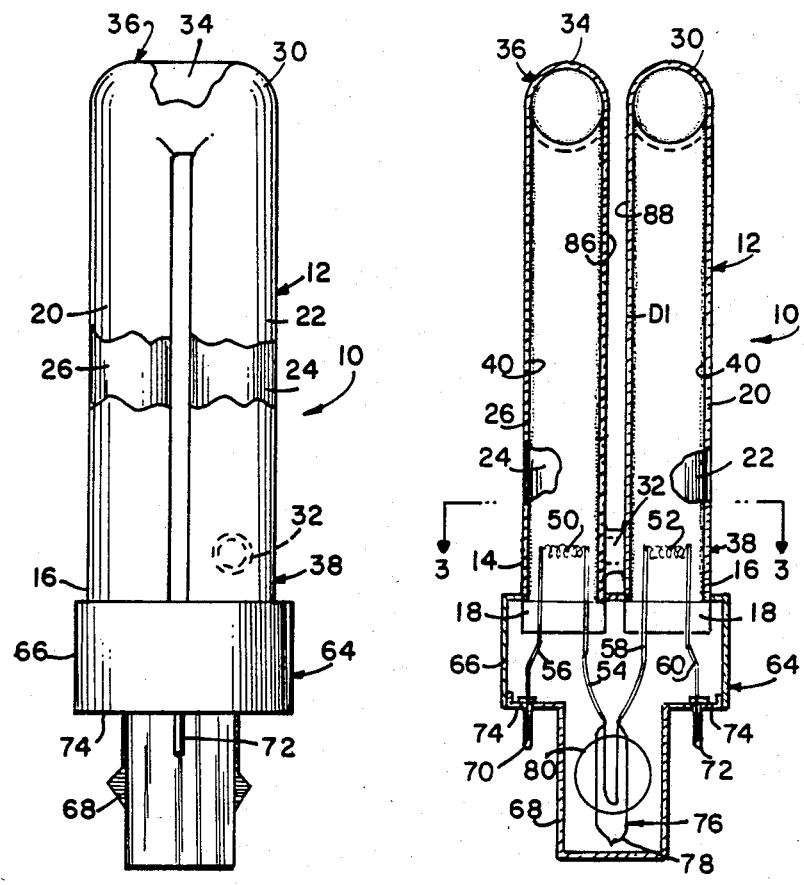
FIG. 1 represents a front elevational view, partially broken away, of an embodiment of a compact fluorescent lamp according to the present invention.
FIG. 2 is a side elevational cross-sectional view of the compact fluorescent lamp in FIG. 1.
Figures 3, 4:
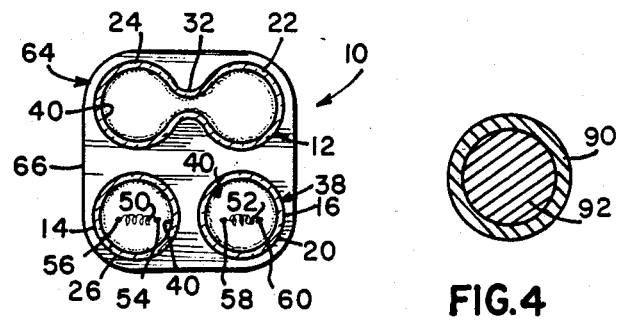
FIG. 3 is a cross-sectional view of the compact fluorescent lamp taken along the line 3—3 in FIG. 2.
FIG. 4 is a cross-sectional view of a lead-in wire according to the teachings of the present invention.

Referring now to the drawings with greater particularity to FIG. 1, there is illustrated an arc discharge lamp 10, such as a fluorescent lamp, including a sealed envelope 12 of light-transmitting vitreous material such as soda-lime or lead glass and having a pair of end portions 14, 16. The envelope contains an ionizable medium including a quantity of mercury and an inert starting gas at low pressure, for example, in the order of 1–5 mm of mercury. The starting gas can be, for example, argon, krypton, neon, or helium, or a mixture of these and other gases. In the cross-sectional views of lamp 10, as illustrated in FIGS. 2 and 3, an electrode structure is located within each end portion 14, 16 and consists of an electrode and a pair of lead-in wires which are sealed, for example, by means of a press seal 18. A glass press construction is favored over the use of the historic stem construction or the use of glass support beads for reasons of minimized lamp materials cost and ease of lamp assembly on modern high speed fully automated manufacturing equipment.

Electrodes 50, 52 are supported by lead-in wires 54, 56 and 58, 60, respectively. Electrodes 50, 52 can be, for example, a double or triple-coiled tungsten filament of the usual type and carry a coating thereon which is usually in the form of carbonates which upon processing, are converted to oxides. A phosphor layer 40, which converts the ultraviolet radiation generated in the mercury discharge into visible radiation, is disposed on the internal surface of envelope 12.

Envelope 12 of arc discharge lamp 10 includes four longitudinally extending leg members 20, 22, 24, 26 and three transversely extending envelope portions 30, 32, 34. Longitudinally extending leg members 20, 22, 24, 26 are so arranged that they intersect the angles of a square in individual cross-sectional planes. The first leg member 20 and the second leg member 22 are connected at the ends 36 remote from end portions 14, 16 by the first transversely extending envelope portion 30. The second leg member 22 and third leg member 24 are connected at substantially the ends 38 adjacent end portions 14, 16 by the second transversely extending envelope portion 32. The third leg member 24 and the fourth leg member 26 are connected at ends 36 remote from end portions 14, 16 by the third transversely extending envelope portion 34. The transversely extending envelope portions may have various other shapes, for example, a more rounded U-shape than depicted by envelope portions 30, 34. Also, the transversely extending envelope portions joining a plurality of leg members may all have the same general shape.

As best shown in FIGS. 2 and 3, lamp end portions 14, 16 may be adjacently located and may be connected to a suitable lamp base 64 including a generally square-shaped upper portion 66 and a lower portion 68. Illustrated in FIG. 2 is a conventional starter 76 including a glow bottle 78 and a radio frequency suppressing capacitor 80 located within lower portion 68 of lamp base 64 and is electrically connected to lead-in wires 54 and 58. A pair of electrical contacts 70, 72 project from a surface of lamp base 64 and are electrically connected to lead-in wires 56, 60, respectively.

As previously stated, higher wattage, (approximately 13 watts or greater) compact fluorescent lamps having oxidized nickel-iron lead-in wires may develop seal cracks when operated in some enclosed or convection-restricted fixtures. Although the problem is not completely understood, it is believed that the combined effect of the ultraviolet radiation produced in the lamp and the increased seal temperatures on the $Fe_2O_3$ layer causes the stress conditions of the seal to change during lamp operation.

It has been discovered the provision of a metallic plating 90 (FIG. 4) on the core 92 of lead-in wires 54, 56, 58, 60 prevents formation of the oxide layer during sealing. It has been found that the seal will withstand seal temperatures up to at least 260 degrees Celsius and thereby maintain the hermeticity of the seal. Preferably, the metallic plating is selected from a group consisting of nickel, chromium, platinum and gold.

In a preferred embodiment, the lead-in wires are formed from an alloy consisting of 50.5 percent by weight nickel and 49.5 percent by weight iron. Such an alloy is commercially available under the name "Niron 52". The lead-in wires are plated so as to produce a gas free wire by using conventionally known plating techniques. The thickness of the plating on the surface of the core should be thick enough so as to form a continuous layer. Typically, the plating is applied so as to equal from about one to ten percent by weight of the completed wire. At very low plating weights (i.e., less than one percent), the plating tends to not be continuous, particularly if the wire is subjected to any drawing operations or scuffing during winding or forming after plating. Higher plating weights significantly increase the cost of the wire and increase the thermal expansion mismatch with the glass, unless the core alloy is modified to compensate for the presence of the nickel.

Although it is only necessary to plate the portion of the lead-in wire that is sealed in the glass, the entire surface of the lead-in may be covered with the plating material.

The thermal seal endurance of lamps was evaluated by operating the lamps with an inorganic fibrous insulation blanket surrounding the seal. Under these conditions, seal temperatures can reach as high as 240 degrees Celsius and potential seal failures show up in a period of hours rather than the days or weeks required during normal operating conditions Testing for hermeticity is done at an seal temperature of 150 degrees Celsius on a helium spectrometer leak detector.

In a practical but non-limiting example of the above-described invention, the lamp is an F13DTT lamp similar in construction to that illustrated in FIGS. 1–3. The lamp has four longitudinally extending leg members and three transversely extending envelope portions. The overall length of the lamp is approximately 4.60 inches (117 millimeters). The lamp has a G23D base which contains a glow bottle and a radio frequency suppressing capacitor. The four lead-in wires were formed from 0.016 inch diameter Niron 52 nickel-iron wire which was nickel plated. The nickel plating equaled about 4 percent by weight. TABLE I below shows the results of the forced heat test:

TABLE I

| DURATION | SEAL TEMPERATURE | NO. TESTED | NO. FAILED |
|---|---|---|---|
| 20 Hours | 260° C. | 8 | 0 |
| 16 Hours | 242° C. | 7 | 0 |

The performance of similar lamps using 0.016 inch Niron 52 nickel-iron lead-in wires without nickel plating is show in TABLE II below:

TABLE II

| DURATION | SEAL TEMPERATURE | NO. TESTED | NO. FAILED |
|---|---|---|---|
| 16 Hours | 233° C. | 9 | 8 |
| 17 Hours | 241° C. | 4 | 3 |
| 02 Hours | 236° C. | 18 | 2 |
| 02 Hours | — | 10 | 2 |

It is clear from the data in TABLES I AND II that the use of a nickel plated lead-in wire can significantly improve lamp performance.

Additional testing involved the operating of lamps in closed, reflector-type fixtures in a base-up attitude. Control U.S. F13DTT (13 watt) lamps made with unplated Niron 52 wire gave one failure out of eleven lamps after 234 hours of operation. Similar lamps made with nickel plated wire have shown no failures due to seal leaks out of twelve samples after 5850 hours of operation. One lamp failed at 4892 hours due to an unrelated ballast short.

According to the present invention, a metallic plating on the surface of the lead-in wires used for compact fluorescent lamps promotes a glass-to-metal seal that remains leak free after thousands of hours operation at elevated temperatures. The use of nickel plated wire was found to provide a more consistent, forgiving, and trouble-free glass-to-metal seal for use on high speed, automated fluorescent lamp manufacturing equipment. Although satisfactory seals can be made with unplated wire, the use of a nickel plating provides an operating margin of safety.

While there have been shown and described what are at present considered to be the preferred embodiments of the invention, it will be apparent to those skilled in the art that various changes and modifications can be made herein without departing from the scope of the invention. The embodiments shown in the drawings and described in the specification are intended to best explain the principles of the invention and its practical application to hereby enable others in the art to best utilize the invention in various embodiments and with various modifications as are suited to the particular use contemplated.

What is claimed is:

1. A fluorescent lamp comprising:
   a sealed envelope of light-transmitting vitreous material having a pair of end portions;
   a phosphor layer disposed on the internal surface of said envelope;
   an ionizable medium contained within said envelope; and
   an electrode structure sealed within each of said end portions and including an electrode supported by a pair of lead-in wires; said lead-in wires having a core comprising nickel and iron, said core having a metallic plating thereon sufficient to prevent formation of $Fe_2O_3$ during sealing so as to prevent cracks from forming in the seal between said envelope and said lead-in wires at an elevated temperature during lamp operation.

2. The flourescent lamp of claim 1 wherein said plating is selected from the group consisting of nickel, chromium, platinum and gold.

3. The fluorescent lamp of claim 2 wherein said plating is nickel.

4. The fluorescent lamp of claim 3 wherein said nickel plating equals from about one percent by weight to about ten percent by weight of said lead-in wires.

5. The fluorescent lamp of claim 4 wherein said nickel plating equals about four percent by weight of said lead-in wires.

6. The fluorescent lamp of claim 1 wherein said core of said lead-in wires consists of a nickel-iron alloy.

7. The fluorescent lamp of claim 6 wherein said nickel-iron alloy core is 50.5 percent by weight nickel and 49.5 percent by weight iron.

8. The fluorescent lamp of claim 6 wherein said plating on said lead-in wires is nickel.

9. The fluorescent lamp of claim 7 wherein said lead-in wires have an outside diameter of approximately 0.016 inch.

10. The fluorescent lamp of claim 1 wherein said vitreous material of said envelope is soda-lime glass.

11. The fluorescent lamp of claim 1 wherein said lamp is a compact fluorescent lamp having at least two longitudinally extending leg members and at least one transversely extending envelope portion for interconnection between said leg members.

12. The fluorescent lamp of claim 11 wherein said envelope comprises four of said longitudinally extending leg members and three of said transversely extending envelope portions.

13. The fluorescent lamp of claim 12 wherein said lamp has a lamp wattage of approximately 13 watts or greater.

14. A fluorescent lamp comprising:
   a sealed glass envelope having a pair of end portions;
   a phosphor layer disposed on the internal surface of said envelope;
   an ionizable medium contained within said envelope; and
   an electrode structure sealed within each of said end portions and including an electrode supported by a pair of lead-in wires; said lead-in wires having a nickel-iron alloy core with a nickel plating thereon, the seal formed between said glass and said lead-in wires being sufficient to maintain seal hermeticity when the temperature of said seal reaches about 160 degrees Celsius during operation of said lamp.

15. The fluorescent lamp of claim 14 wherein said nickel plating equals from about one percent by weight to about ten percent by weight of said lead-in wires.

16. The fluorescent lamp of claim 1 wherein said nickel-iron alloy core is 50.5 percent by weight nickel and 49.5 percent by weight iron.

17. The fluorescent lamp of claim 14 wherein said seal temperature is within the range of from about 160 degrees Celsius to about 250 degrees Celsius.

18. The fluorescent lamp of claim 14 wherein said seal is a press seal.

* * * * *